United States Patent [19]
Saito et al.

[11] Patent Number: 5,329,523
[45] Date of Patent: Jul. 12, 1994

[54] EXTENSION AGENT SYSTEM OF ISDN ELECTRONIC EXCHANGE

[75] Inventors: Sachiko Saito; Takeshi Uehara, both of Kawasaki, Japan

[73] Assignee: Fujitsu Limited, Kawasaki, Japan

[21] Appl. No.: 945,130

[22] Filed: Sep. 15, 1992

[30] Foreign Application Priority Data

Sep. 18, 1991 [JP] Japan .................. 3-237728

[51] Int. Cl.$^5$ ............ H04J 3/02; H04Q 11/04; H04M 3/54
[52] U.S. Cl. .................. 370/58.1; 379/265; 379/211; 370/110.1
[58] Field of Search ............ 379/93, 94, 156, 211, 379/212, 265, 266, 213, 214; 370/58.1, 62, 110.1

[56] References Cited

U.S. PATENT DOCUMENTS

| | | | |
|---|---|---|---|
| 4,656,623 | 4/1987 | Dalby, Sr. et al. | 370/60 |
| 4,888,766 | 12/1989 | Ogasawara | 370/95.1 |
| 4,988,209 | 1/1991 | Davidson et al. | 370/58.2 |
| 5,023,868 | 6/1991 | Davidson et al. | 370/62 |
| 5,062,103 | 10/1991 | Davidson et al. | 370/58.1 |
| 5,168,515 | 12/1992 | Gechter et al. | 379/265 |

*Primary Examiner*—James L. Dwyer
*Assistant Examiner*—Daniel S. Hunter

[57] ABSTRACT

An extension agent system of an ISDN electronic exchange having a switching network to which interfaces grouped into groups are connected, wherein extension agent numbers are respectively assigned to the groups of the interfaces and each interface includes a plurality of channels, has a management unit which manages first information indicating, for each interface, the number of channels being used and second information indicating, for each interface, the number of available channels. The management unit includes a table which stores third information indicating, for each of the groups of the interfaces, a sequence of the interfaces to be accessed such that one of the interfaces receives a call having the extension agent number. The system also has a control unit which selects one of the interfaces for receiving a call having the extension agent number on the basis of the first information, the second information and the third information.

18 Claims, 6 Drawing Sheets

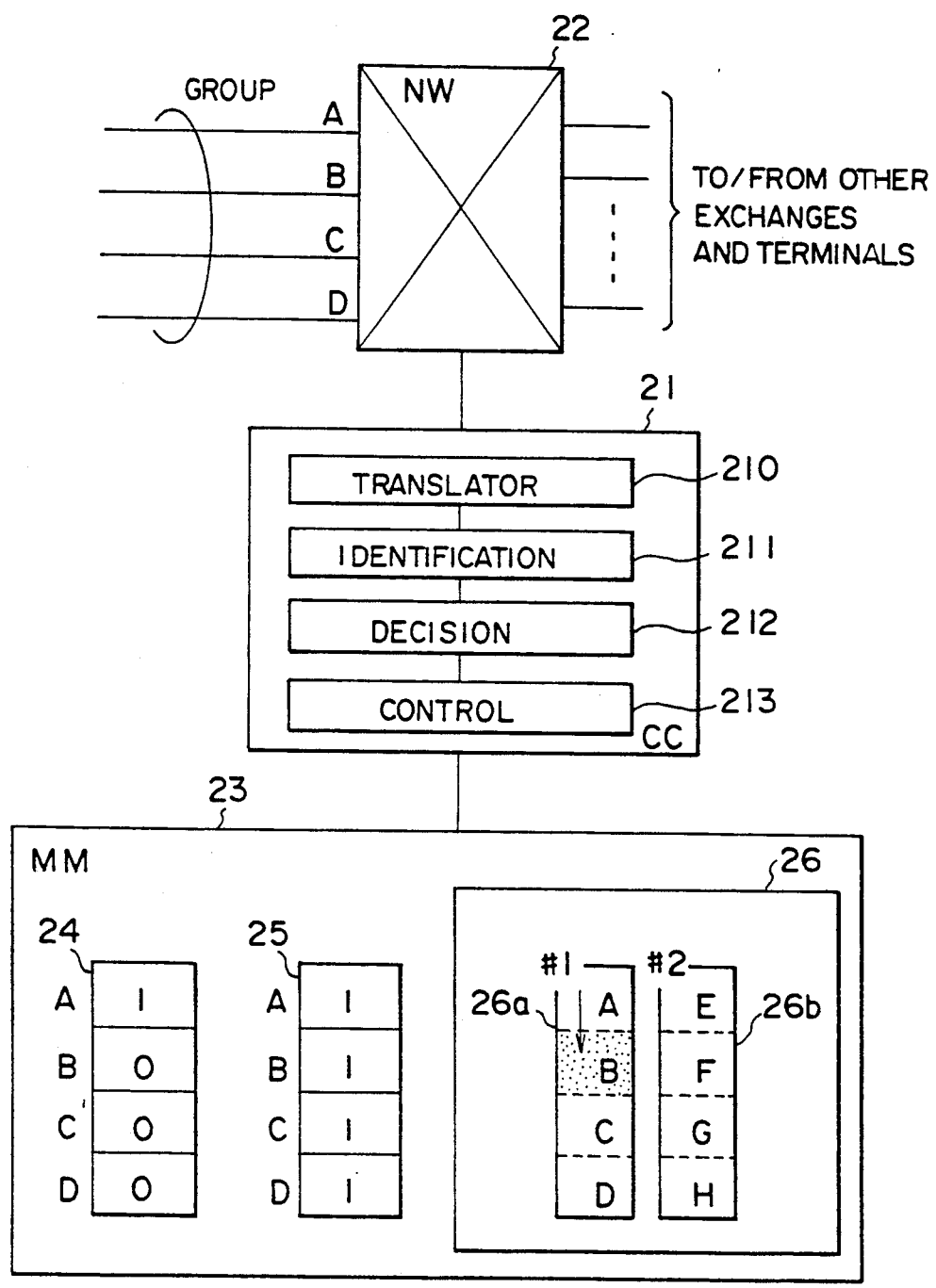

FIG. 8
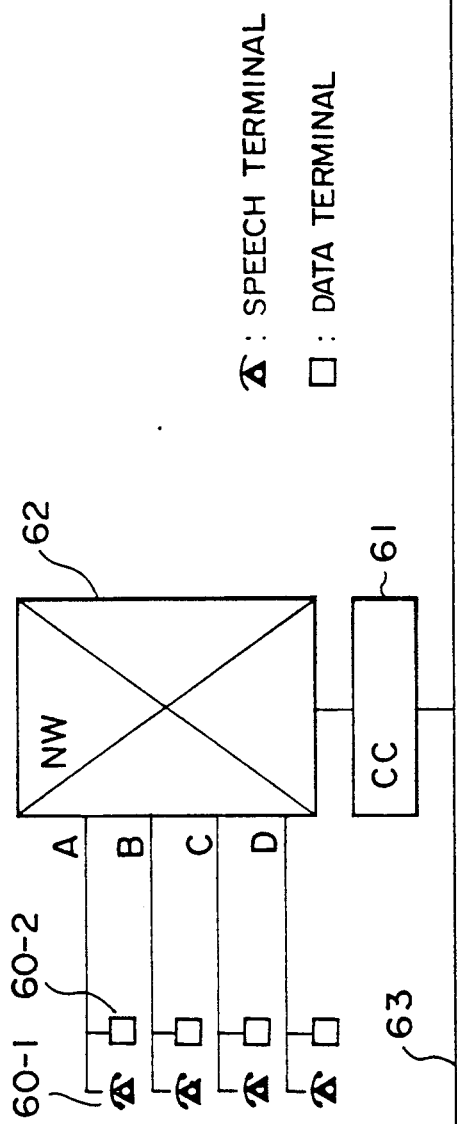
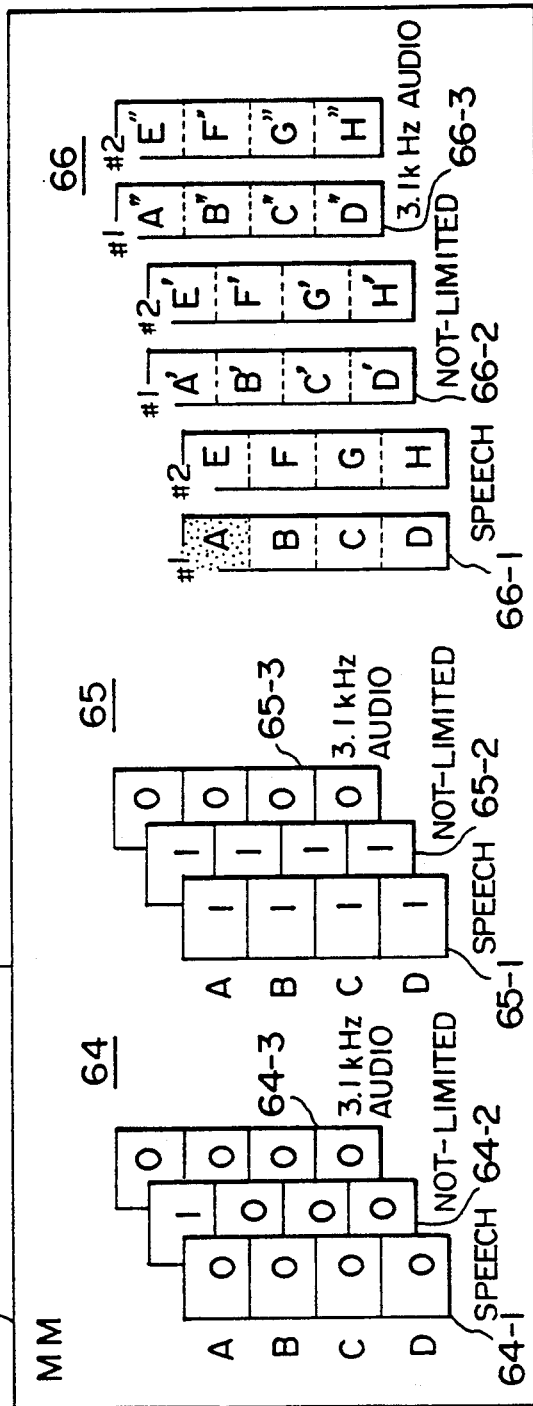

EXTENSION AGENT SYSTEM OF ISDN ELECTRONIC EXCHANGE

BACKGROUND OF THE INVENTION

1. Field of the Invention

The present invention generally relates to an ISDN (Integrated Services Digital Network) electronic exchange having a central processing unit and a storage unit, and more particularly to an extension agent system installed in such an ISDN exchange.

2. Description of the Prior Art

In an extension agent system of an electronic exchange, an extension agent number is assigned to a plurality of terminals, such as telephone sets. When a call addressed to the extension agent number is received, the terminals are searched for in a predetermined sequence in order to determine whether or not an idle terminal is available. Then, the received call is transferred to an idle terminal which is first accessed.

The basic interface of the ISDN uses a plurality of channels (2B and D) for an interface. In an extension agent system configured in conformity with the ISDN basic interface, even if one of the channels of an interface is busy, this interface is recognized to be idle when the other channel is idle. In a case where a speech terminal is connected to one of the B channel in each interface forming the extension agent system and a terminal other than a speech terminal is connected to the other channel therein, each interface is recognized to be idle even when the speech terminal connected to each interface is busy. Hence, the extension agent system cannot operate.

FIG. 1 is a block diagram of an electronic exchange having a conventional extension agent system, and FIG. 2 is a flowchart showing the operation of the conventional extension agent system. The electronic exchange shown in FIG. 1 comprises a switching network (NW) 10, a central processing unit (CC: hereinafter simply referred to as a controller) 11, and a main memory (MM) 12. Terminals A-D connected to the switch 10 belong to an extension agent group. The main memory 12 includes an extension agent table 13, which has idle/busy information 13a and hunting group information 13b. The idle/busy information 13a show whether the terminals A-D belonging to the identical agent group are respectively busy or idle. The hunting group information 13b show a sequence of hunting in order to obtain an idle terminal.

Referring to FIG. 2, the controller 11 confirms, in step S1, completion of receipt of an extension agent number assigned to the agent group having the terminals A-D. For example, the extension agent number is aft identification number of the terminal A which has priority over the terminals B-D with respect to the hunting procedure. Further, in step S1, the controller 11 translates the received number and recognizes that the received number is the extension agent number. In step S2, the controller 11 refers to the busy/idle information 13a and the handling group information 13b stored in the table 13, and determines whether the terminal A located at the top of the handling sequence is idle or busy. When the terminal A is idle, the controller 11 makes a connection between a terminal sending the call and the terminal A in step S4. When it is determined, in step S2, that the terminal A is busy, the controller 11 refers to the table 13, and selects the terminal B which has the second priority in step S3. Then, the controller 11 determines whether or not the terminal B is idle or busy in step S2. In this manner, all the terminals indicated by the hunting group information 13b are sequentially accessed until an idle terminal is found. If it is determined that all the terminals A-D are busy, the controller 11 sends a busy tone to the calling terminal.

If the above-mentioned extension agent system is applied to an ISDN electronic exchange (see CCITT Recommendation Q. 931, "ISDN USER-Network Interface Layer 3 Specification For Basic Call Control", for example), the following problem will occur. As has been described previously, one interface between an user and the network 10 includes a plurality of channels (two B channels and one D channel). Each of the subscribers A-D has two B channels respectively having a bit rate of 64 Kbps and one D channel having a bit rate of 16 Kbps. It will now be assumed that each of the subscribers A-D respectively has only a speech-system terminal (normal telephone set). In this case, the controller 11 refers to the hunting group information 13b in response to receipt of an extension agent number, and determines whether or not the subscriber A is idle or busy. If the subscriber A is communicating with another subscriber via one of the two B channels, the other B channel is idle. In this case, the controller 11 tries to make a connection between the calling terminal and the idle B channel because all the B channels are not busy. A terminal other than the speech-system terminal is not connected to the extension of the subscriber A. Hence, the controller 11 receives no response from the subscriber A, and does not make a connection with the calling terminal. That is, the controller 11 does not hunt the subscriber B.

SUMMARY OF THE INVENTION

It is a general object of the present invention to provide an extension agent system of an ISDN electronic exchange in which the above problem is eliminated.

A more specific object of the present invention is to provide an extension agent system in which if an interface related to an extension agent has a channel to which a terminal is not connected, the above channel is ignored and another interface is searched for in order to terminate a call having an extension agent number at an idle interface.

The above objects of the present invention are achieved by an extension agent system of an ISDN electronic exchange having a switching network to which interfaces grouped into groups are connected, extension agent numbers being respectively assigned to the groups, each of the interfaces including a plurality of channels, the extension agent system comprising: management means for managing first information indicating, for each of the interfaces, the number of channels in use, second information indicating, for each of the interfaces, the number of usable channels, and third information indicating, for each of the groups, a sequence of the interfaces to be accessed so that one of the interfaces receives a call having the extension agent number; and control means, operatively coupled to the management means, for selecting one of the interfaces for receiving a call having the extension agent number on the basis of the first information, the second information and the third information.

The above objects of the present invention are also achieved by an extension agent system of an ISDN electronic exchange having a switching network to which interfaces grouped into groups are connected, extension agent numbers being respectively assigned to the groups, each of the interfaces including a plurality of channels of different types, the extension agent system comprising: management means for managing first information indicating, in each of the different types of channels of each interface, the number of channels in use, second information indicating, in each of the different types of channels of each interface, the number of usable channels, and third information indicating, for each group in each of the different types of channels, a sequence of the interfaces to be accessed so that one of the interfaces receives a call having the extension agent number; and control means, operatively coupled to the management means, for selecting one of the interfaces for receiving a call having the extension agent number on the basis of the first information, the second information and the third information.

BRIEF DESCRIPTION OF THE DRAWINGS

Other objects, features and advantages of the present invention will become more apparent from the following detailed description when read in conjunction with the accompanying drawings, in which:

FIG. 3 is a block diagram of an ISDN digital exchange having an extension agent system according to a first embodiment of the present invention;

FIG. 8 is a block diagram of an ISDN electronic exchange according to a second embodiment of the present invention.

DESCRIPTION OF THE PREFERRED EMBODIMENTS

Figure 2:
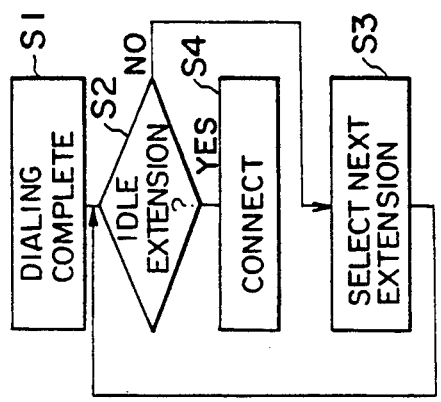
FIG. 2 is a flowchart showing the operation of the conventional extension agent system shown in FIG. 1.
Figure 1:
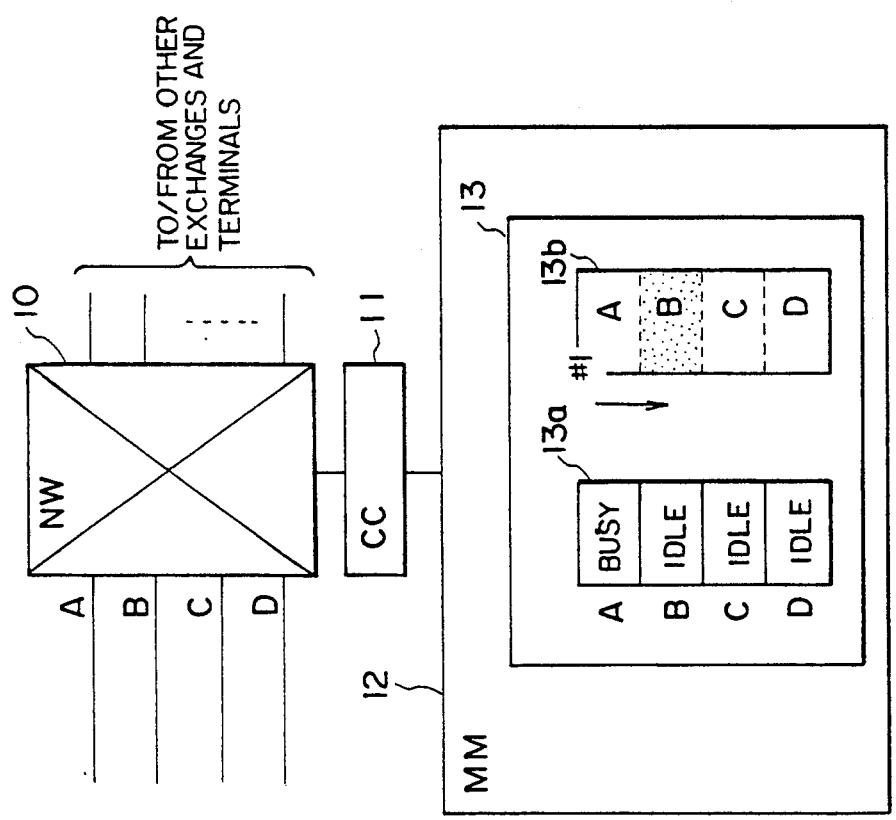
FIG. 1 is a block diagram of an electronic exchange having a conventional extension agent system.

FIG. 3 shows an ISDN digital exchange having an extension agent system according to a first embodiment of the present invention. The ISDN electronic exchange comprises a central processing unit (hereinafter simply referred to as a controller) 21, a network (NW) 22, and a memory unit 23. Subscriber line interfaces A-D, which are ISDN basic interfaces (2B+D) are connected to the network 22. An extension agent group #1 consists of the interfaces A-D.

The controller 21 comprises a number translator unit 210, a group identification information decision unit 211, usable channel count/usable number decision unit 212, and a connection control unit 213. The memory unit 23 stores usable channel count information 24, usable channel number information 25, and an extension agent table 26. This table 26 stores hunting group information pieces 26a and 26b. The usable channel count information 24 indicates, for each of the interfaces A-D, the number of channels which are now in use. The available channel number information 25 indicates, for each of the interfaces A-D, the number of usable or available channels, which number corresponds to the number of terminals currently connected to each interface. The hunting group information pieces 26a and 26b indicate a sequence of handling for the respective groups. The hunting group information piece 26b relates to a group #2 consisting of interfaces E-H connected to the network 22.

In FIG. 3, the usable channel count information 24 shows that one channel of the interface A is in use, and the interfaces B-D are completely idle. The usable channel number information 25 shows that each of the interfaces A-D has one usable channel (one terminal).

When a subscriber (not shown) calls the extension agent number (which is the identification number of the subscriber A), the number translator unit 210 translates the received extension agent number, and recognizes that it is addressed to the extension agent group #1. Then, the group information identification unit 211, which is activated by the unit 210, and refers to the corresponding hunting group information 26a stored in the table 26 in the storage unit 23, and selects the interface A located at the beginning of the information 26a. The usable channel count/usable number decision unit 212 compares the number of in-use channels indicated by the channel count information 24 related to the interface A with the number of available channels indicated by the available channel number information 25 related to the interface A.

When the number of channels in use is smaller than the number of available channels, the unit 212 recognizes that a channel (terminal) capable of receiving a call is available. Then, the unit 212 updates the available channel number information 25 so that the number of available channels in the interface A is incremented by 1, and instructs the connection control unit 213 so that a connection using the available channel is made. The connection control unit 213 makes a connection between the calling terminal and the idle terminal connected to the interface A.

When the number of channels in use is equal to the number of available channels, the unit 212 selects the next interface (interface B in this case) by referring to the hunting group information 26a related to the extension agent group #1. Then, the unit 212 operates in the same manner as described above. In this manner, even if an interface has a channel to which no terminal is connected, the next interface is hunted when all channels to which terminals are connected are busy.

Figure 4:
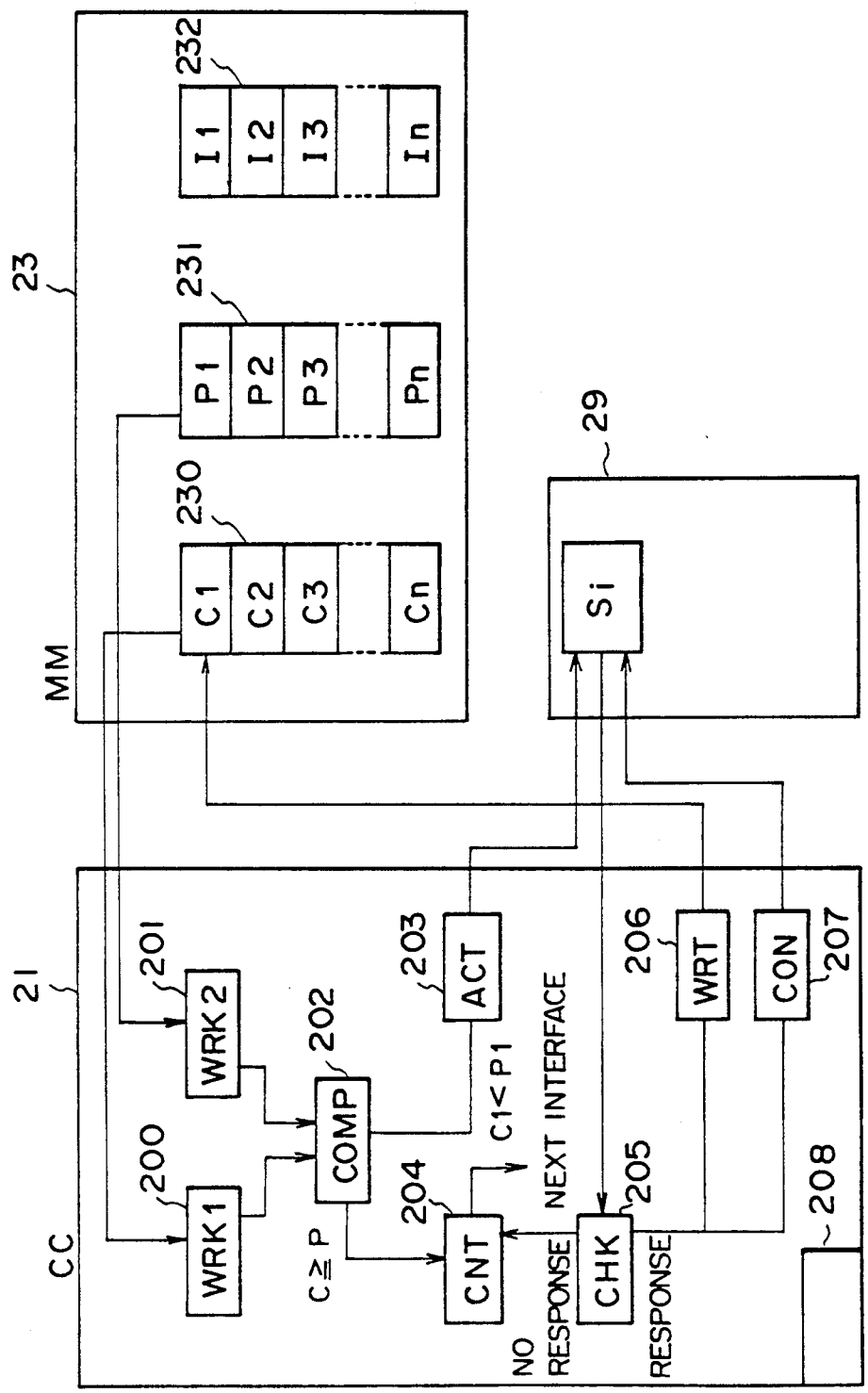
FIG. 4 is a block diagram showing the details of the structure shown in FIG. 3.
Figure 6:
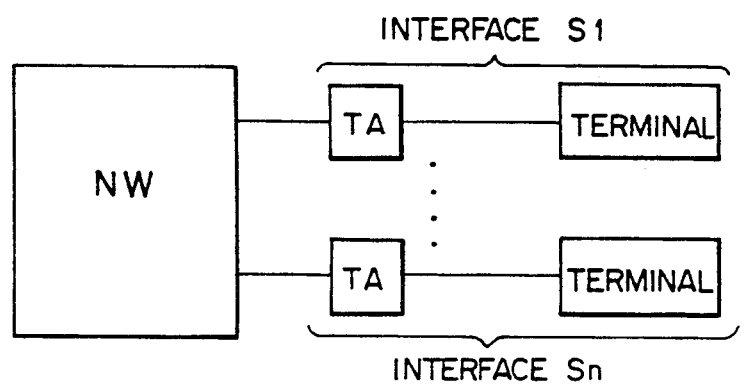
FIG. 6 is a block diagram of an network.

FIG. 4 is a block diagram of the details of the configuration shown in FIG. 3. The configuration shown in FIG. 4 is applied to, for example a network as shown in FIG. 6. Subscribers (interfaces) S1-Sn belong to an extension agent group. Terminals, such as telephone sets, are coupled to the network NW via terminal adapters TA.

In FIG. 4, parts that are the same as parts shown in the previously described figures are given the same reference numerals as previously. A reference number 29 indicates an interface Si, which is one of the interfaces shown in FIG. 6. The memory unit 23 stores channel count information 230 for the channels in use on the interfaces S1-Sn, available channel number information 231 thereon, and hunting group information 232 thereon. The controller 21 comprises work areas 200 (WRK1) and 201 (WRK2), a comparator (COMP) 202, an actuator (ACT) 203, a counter (CNT) 204, a check unit (CHK) 205, a write unit (WRT) 206, a connection unit (CON) 207, and a control unit 208. The control unit 208 controls the structural parts shown in FIG. 4, and the entire operation of the controller 21. The control unit 208 is connected to the memory unit 23 via a bus (not shown in FIG. 4 for the sake of simplicity).

The operation of the configuration shown in FIG. 4 will now be described with reference to FIG. 5. When dialing is completed in step 30, the control unit 208 accesses interface information I1 located at the beginning of the hunting group information 232 in step 31. Then, the control unit 208 reads, from the channel count information 230, information C1 indicating the number of channels in use in the interface I1, and reads, from the available channel number information, information piece P1 indicating the number of channels usable or available in the interface I1. The readout information pieces C1 and P1 are respectively written into the work areas 200 and 201. In step 32, the comparator 202 determines whether or not the number P1 of channels available in the interface I1 is larger than the number C1 of channels which are now in use in the interface I1.

When the number P1 of channels available is larger than the number C1, the actuator 203 activates the interface Si (i=1) in step 33. According to the conventional ISDN protocol, a call setup message is sent to the interface S1 via the D (control) channel. The check unit 205 determines, in step 34, whether or not a response message based on the D-channel protocol is received from the terminal via the interface S1. When the response is received, the write unit 206 increments the count value C1 by 1 in step 35, and the connection unit 207 makes a connection between the calling terminal and the interface I1 in step 36.

When it is determined, in step 32, that the number P1 of channels available in the interface I1 is equal to or smaller than the number C1 of channels which are now in use in the interface I1, the counter 204 increments its count value by 1 in order to access the next interface (I2 in this case). In response to receipt of the count value of the counter 204, the control unit 208 refers to the hunting group information 232 and obtains information concerning the next interface I2 in step 37. Then, step 31 is executed in the same manner as described above.

Step 37 is also executed when it is determined that the check unit 205 does not have the D-channel protocol the response message from the terminal via the selected interface S1. In this case, the check unit 205 sends to the counter 204 an increment request signal based on the fact that no response has been received.

The negative decision in step 34 will be made in any of the following first through third cases. In the first case, an acknowledgement message (Call Proceeding, Alert, Connect) is not received after completion of the call setup procedure. In the second case, a release message (Release, Release Complete) is not received after completion of the call setup procedure. In the third case, a disconnect message is received and cause information is "User Busy (No. 17)" after completion of the call setup procedure.

Figure 5:
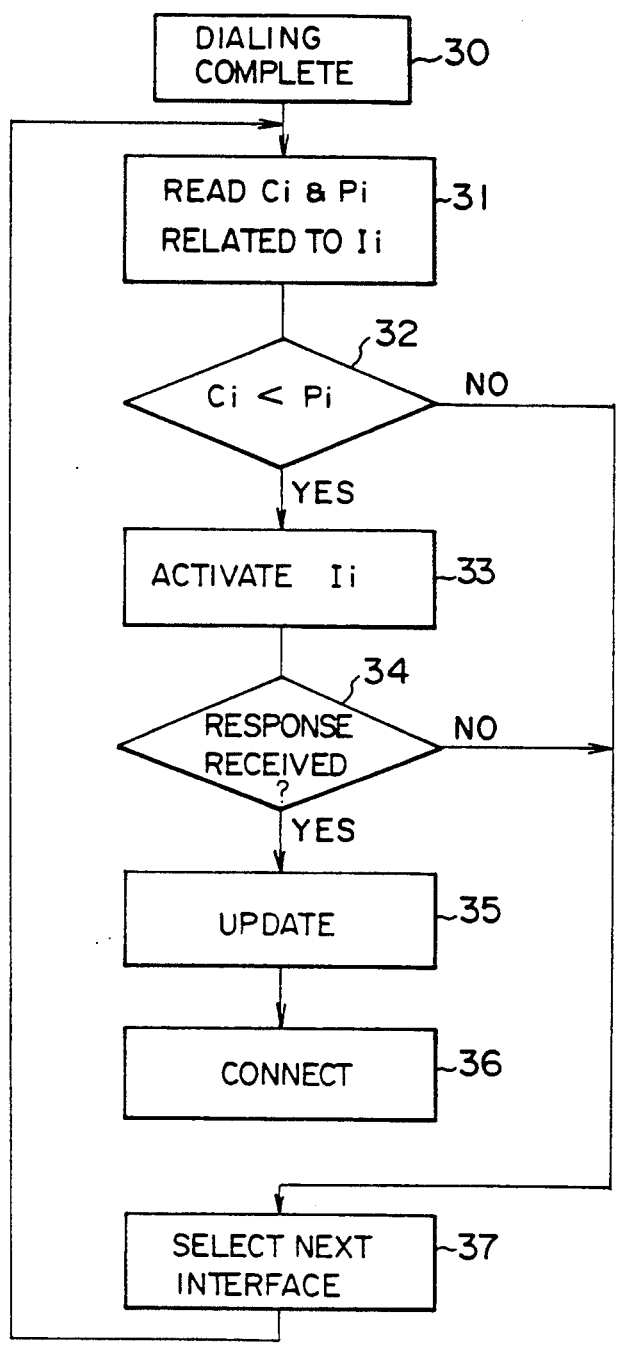
FIG. 5 is a flowchart showing the operation of the first embodiment of the present invention.
Figure 7:
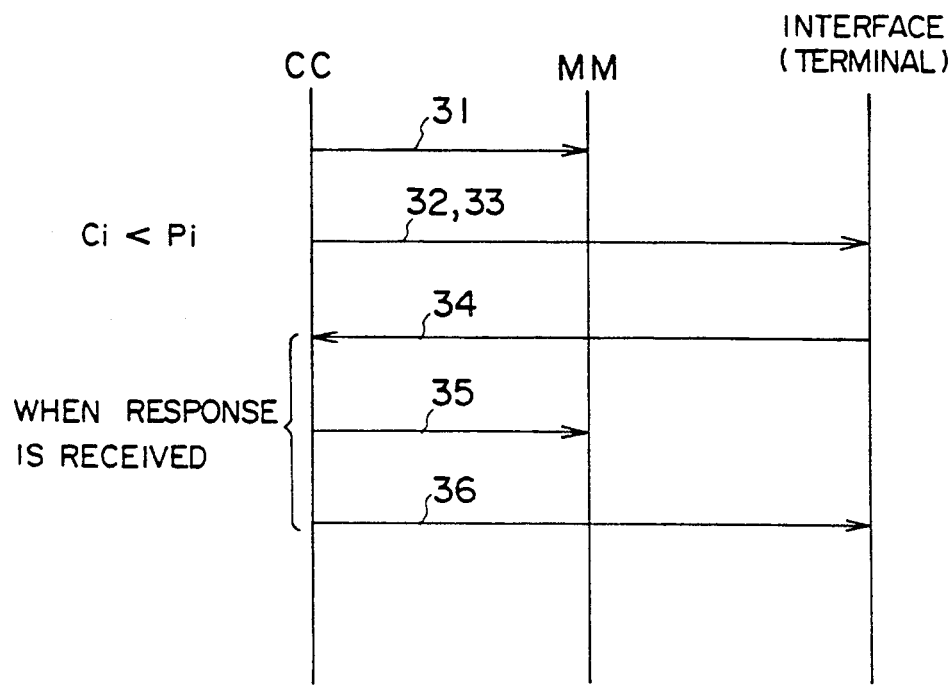
FIG. 7 is a sequence diagram showing the operation of the first embodiment of the present invention.

FIG. 7 shows a sequence showing the operation controlled by the process shown in FIG. 5. The references numbers used in FIG. 7 correspond to the step numbers used in FIG. 5.

FIG. 8 is a block diagram of an electronic exchange having an extension agent system according to a second embodiment of the present invention. The electronic exchange shown in FIG. 8 comprises a central processing unit (CC; hereafter simply referred to as a controller) 61, a network (NW) 62, and a memory unit (MM) 63. The network 62 accommodates not only speech terminals 60-1, such as telephone sets, but also data terminals 60-2. The interfaces A–D belong to one extension agent group.

Information transmittable through each of the interfaces A–D has three types of channels, that is, a speech channel, an unrestricted digital channel, and a 3.1 kHz audio channel. The speech channel has a bit rate of 64 Kbps. The unrestricted digital channel has a bit rate of 64 Kbps. The 3.1 kHz audio channel is used for a modem (modulator/demodulator) suitable for a public telephone line or facsimile transmission. The memory unit 63 stores, for the respective three channels, usable channel count information 64, available channel number information 65, and hunting group information 66. More particularly, the usable channel count information 64 contains usable channel count information pieces 64-1, 64-2 and 64-3 for the respective channel types. Similarly, the available channel number information 65 contains available channel number information pieces 65-1, 65-2 and 65-3 for the respective channel types. The hunting group information 66 contains, for each of the groups #1 and #2, hunting group information pieces 66-1, 66-2 and 66-3 for the respective channel types.

In the status shown in FIG. 8, one speech terminal and one data terminal are connected to respective channels of the interface A. The number of usable unrestricted channels of the interface A is 1, and the number of unrestricted channels in use is also 1. Hence, the unrestricted channel is busy at this time. The number of usable speech channels of the interface A is 1 and the number of unrestricted channels in use is 0. Hence, the speech channel is idle at present.

The configuration shown in FIG. 8 operates, for each of the channel types, in the same manner as shown in FIG. 5. That is, the controller 61 receives a call setup message in which identification information indicating an information transfer capability, and identification information indicating a called terminal. The controller 61 recognizes the information transfer capability, and selects one of the hunting group information pieces 66-1–66-3 in accordance with the information transfer capability. Then, the controller 61 selects the first interface (for example, interface A") of the selected hanging group, and selects a related one of the usable channel count information pieces 64-1–64-3 and a related one of the usable channel number information pieces 65-1–65-3. If the information transfer capability indicated by the identification information contained in the call setup message corresponds to the speech channel, the interface A is hunted without hunting the interface B since the number of channels in use in the interface A is zero.

The present invention is not limited to the specifically disclosed embodiments, and variations and modifications may be made without departing from the scope of the present invention.

What is claimed is:

1. An extension agent system of an ISDN electronic exchange having a switching network to which interfaces grouped into groups are connected, extension agent numbers being respectively assigned to said groups, each of the interfaces including a plurality of channels, said extension agent system comprising:

management means including a table and operated for managing first information indicating, for each interface in each group, the number of channels in use, second information indicating, for each interface in each group, the number of available channels, and third information stored in said table and indicating, for each of the groups, a sequence of the interfaces to be accessed so that one of the interfaces receives a call having the extension agent number; and control means, operatively coupled to said management means, for comparing the first information with the second information to determine whether or not there is an available channel in an interface to which said first and second information refers and if a channel is available in said interface, said interface receives a call having the extension agent number and, if no channel is available in said interface, said control means selects a next one of the interfaces for receiving a call having the extension agent number on the basis of the third information.

2. The extension agent system as claimed in claim 1, wherein said control means comprises:

first means for determining whether or not the number of channels indicated by the first information concerning one of the interfaces selected by said control means is larger than the number of available channels indicated by the second information concerning said one of the interfaces selected by said control means; and second means, operatively coupled to said first means, for selecting a next one of the interfaces in accordance with the third information when said first means determines that the number of channels indicated by the first information is larger than the number of available channels indicated by the second information.

3. The extension agent system as claimed in claim 2, further comprising:

determining means for determining whether or not a response has been received by sending said call to said one of the interfaces via the switching network; and updating means, operatively coupled to said management means and said determining means, for updating the first information when said determining means determines that said response has been received, so that the number of channels in use is increased by one.

4. The extension agent system as claimed in claim 3, wherein said response is a response transferred via a control channel which is one of the channels in said one of the interfaces, said control channel being used for controlling communications via the switching network.

5. The extension agent system as claimed in claim 1, wherein said control means comprises:

first means for determining whether or not the number of channels indicated by the first information concerning one of the interfaces selected by said control means is equal to or smaller than the number of available channels indicated by the second information concerning said one of the interfaces selected by said control means; and second means, operatively coupled to said first means, for selecting said one of the interfaces when said first means determines that the number of channels indicated by the first information is equal to or smaller than the number of available channels indicated by the second information.

6. The extension agent system as claimed in claim 1, further comprising translator means connected to the switching network for specifying one of the groups of interfaces from one of the extension agent numbers received via the switching network.

7. The extension agent system as claimed in claim 6, wherein said management means comprises selecting means for specifying one of pieces of the third information in accordance with said one of the groups of interfaces specified by said translator means.

8. The extension agent system as claimed in claim 1, wherein each of the interfaces comprises two information (B) channels and one control (D) channel.

9. An extension agent system of an ISDN electronic exchange having a switching network to which interfaces grouped into groups are connected, extension agent numbers being respectively assigned to said groups, each of the interface including a plurality of channels of different types, said extension agent system comprising:

management means including a table and operated for managing first information indicating, for each of the different types of channels for each of the interfaces, the number of channels in use, second information indicating, for each of the different types of channels for each of the interfaces, the number of available channels, and third information stored in said table and indicating, for each of the groups in each of the different types of channels, a sequence of the interfaces to be accessed so that one of the interfaces receives a call having the extension agent number; and control means, operatively coupled to said management means, for comparing said first information with said second information to determine whether or not there is an available channel in an interface to which said first and second information refer and if a channel is available in said interface, said interface receives a call having the extension agent number and if no channel is available in said interface, said control means selects a next one of the interfaces for receiving a call having the extension agent number on the basis of the third information.

10. The extension agent system as claimed in claim 9, further comprising specifying means for specifying one of the types of channels from predetermined information contained in a message corresponding to said call, wherein said control means comprises selecting means for selecting the first information, the second information and the third information respectively related to said one of the types of channels specified by said specifying means.

11. The extension agent system as claimed in claim 10, wherein said control means comprises:

first means for determining whether or not the number of channels indicated by the first information concerning one of the interfaces selected by said control means is larger than the number of available channels indicated by the second information concerning said one of the interfaces selected by said control means; and second means, operatively coupled to said first means, for selecting a next one of the interfaces in accordance with the third information when said first means determines that the number of channels indicated by the first information is larger than the number of available channels indicated by the second information.

12. The extension agent system as claimed in claim 11, further comprising:

determining means for determining whether or not a response has been received by sending said call to said one of the interfaces via the switching network; and updating means, operatively coupled to said management means and said determining means, for updating the first information when said determining means determines that said response has been received, so that the number of channels in use is increased by one.

13. The extension agent system as claimed in claim 12, wherein said response is a response transferred via a control channel which is one of the channels in said one of the interfaces, said control channel being used for controlling communications via the switching network.

14. The extension agent system as claimed in claim 10, wherein said control means comprises:

first means for determining whether or not the number of channels indicated by the first information concerning one of the interfaces selected by said control means is equal to or smaller than the number of available channels indicated by the second information concerning said one of the interfaces selected by said control means; and second means, operatively coupled to said first means, for selecting said one of the interfaces when said first means determines that the number of channels indicated by the first information is equal to or smaller than the number of available channels indicated by the second information.

15. The extension agent system as claimed in claim 10, further comprising translator means connected to the switching network for specifying one of the groups of interfaces from one of the extension agent numbers received via the switching network.

16. The extension agent system as claimed in claim 15, wherein said management means comprises means for specifying one of the pieces of the third information in accordance with said one of the groups of interfaces specified by said translator means.

17. The extension agent system as claimed in claim 9, wherein each of the interfaces comprises two information (B) channels and one control (D) channel.

18. The extension agent system as claimed in claim 9, wherein each of said interfaces comprises a first channel for transferring speech information, a second channel for transferring digital information, and a third channel for transferring a signal having a frequency lower than frequencies of the speech information and the digital information.

* * * * *